United States Patent [19]

Gallizia

[11] 4,408,980

[45] Oct. 11, 1983

[54] DEVICE FOR MANUFACTURING CLOSED HOLLOW BODIES IN ELASTOMERIC MATERIAL

[75] Inventor: Achille Gallizia, Milan, Italy

[73] Assignee: Industrie Pirelli S.p.A., Milan, Italy

[21] Appl. No.: 316,965

[22] Filed: Oct. 30, 1981

Related U.S. Application Data

[60] Continuation of Ser. No. 104,396, Dec. 17, 1979, abandoned, which is a division of Ser. No. 924,301, Jul. 13, 1978, Pat. No. 4,224,276.

[30] Foreign Application Priority Data

Jul. 21, 1977 [IT] Italy .............................. 25936 A/77

[51] Int. Cl.³ .................... B29H 5/00; B29H 7/00
[52] U.S. Cl. .................................. 425/501; 425/504; 425/515; 425/519; 425/521; 425/548; 425/552; 425/588
[58] Field of Search ............... 425/501, 503, 504, 515, 425/519, 521, 548, 552, 588; 264/545, 571, 574, 248

[56] References Cited

U.S. PATENT DOCUMENTS

| 1,157,420 | 10/1915 | Roberts | 425/501 X |
|---|---|---|---|
| 1,365,462 | 1/1921 | Crawford | 264/545 |
| 2,726,925 | 12/1955 | Saulino | 264/248 X |
| 2,899,711 | 8/1959 | Hawkins et al. | 264/574 X |
| 3,825,457 | 7/1974 | Holroyd et al. | 264/545 X |
| 3,933,967 | 1/1976 | Taylor | 425/519 X |
| 4,028,042 | 6/1977 | Goodpruau et al. | 425/504 X |

*Primary Examiner*—Jan H. Silbaugh
*Attorney, Agent, or Firm*—Stevens, Davis, Miller & Mosher

[57] ABSTRACT

A process and a device for forming a tennis ball by the formation of two semispherical bowls in crude elastomeric material each having on its border a structural shape that is deformed by compression when the two semispherical bowls are pressed one against the other while a depressurization is effected in the joining zone of the two semispherical bowls on the outside of them.

8 Claims, 4 Drawing Figures

DEVICE FOR MANUFACTURING CLOSED HOLLOW BODIES IN ELASTOMERIC MATERIAL

This is a continuation of application Ser. No. 104,396, filed Dec. 17, 1979, now abandoned, which in turn is a division of application Ser. No. 924,301, filed July 13, 1978, now U.S. Pat. No. 4,224,276.

The present invention concerns a process for manufacturing closed hollow bodies in elastomeric material and, more particularly tennis balls.

The present invention refers moreover to a device for carrying out the above-cited process for manufacturing closed hollow bodies in elastomeric material and in particular for manufacturing tennis balls.

Processes and devices for manufacturing tennis balls are already "known".

All these "known" processes for manufacturing tennis balls comprise the steps of firstly forming two semi-spherical bowl in elastomeric material; secondly joining the together along their circumferential edges—originating thus a spherical hollow body; and finally curing the spherical body thus obtained.

The production of tennis balls—effectuated on the basis of the steps of the known process given above, give rise to products—i.e. to tennis balls that are not equally uniform in their "rebound" performance—which is a fundamental requisite for this article and to a considerable number of waste output products.

For overcoming these drawbacks, there are known processes that differ, one from the other, owing to certain modification in the above indicated steps.

One such 'known' process is described in the U.K Pat. No. 1.367.084. The process, according to this patent comprises the phases of:

mechanically working uncured rubber—substantial to destroy its memory, whilst leaving it substantially uncured forming the worked—substantially uncured rubber into two semi-spherical bowls, said semispherical bowl being provided with locking spues joining together the two semispherical bowls, by pressing together the circumferential edge of one bowl against the edge of the other curing the elastomeric material of the two bowls joined together trimming the burrs left by the mould.

Another known process is the one described in U.K. Pat. No. 1,354,760. The process according to this patent comprises the phase of:

forming the uncured rubber into two semispherical bowls curing the two semispherical bowls except their circumferential edge joining together the two semispherical bowls by pressing together the circumferential edge of both bowls against each other curing the elastomeric material that was left uncured.

The tennis balls manufactured with the two above-cited known processes, allow for obtaining quite a satisfactory output as far as regards the uniformity of the "rebound" phenomenon, and as far as concerns a reduction of any waste output.

The aims of the present invention are a process and device for allowing a further improvement in tennis balls especially as regards their uniform "rebound" and a reduction to practically zero of any waste output.

What forms the object of this invention is a process for manufacturing a closed hollow body is elastomeric material characterized by the fact of it comprising the phases of:

Shaping by extrusion complementary parts of a closed hollow body in raw elastomerical material, with forming a structural shape tapered towards the outside on the outline of the said complementary parts.

Joining head-to-head the said complementary parts by pressing together the structural shapes on the outline of the said complementary parts first in correspondence of that part of the structural shapes that is innermost with respect to the cavity of the hollow body, then the parts of the structural shape comprised between their edges and then the part of the structural shape that is outermost with respect to the cavity of the hollow body.

Vulcanizing, in a way known per se the elastomeric material of the closed hollow body.

A further object of this invention is a device for manufacturing closed hollow bodies—characterized by the fact of comprising a mould constituted by a core and by two covers situated on the opposite sides of the core, said core and said covers delimiting between them at least a pair of semispherical bowls cavities, each one of said cavity being provided—in correspondence of its border with an annular cavity having a trapeze form in cross-section, said care and said covers provided with cavities that are in communication with the outside, one of said covers being further provided—on its side turned to face the core—with a cylindrical relief, and the other cover being provided on its side turned to face the core with a cylindrical depression, said relief and depression being complementary to each other, in such a way as to define between them an hollow space—and a conduit being provided inside one of the covers, for putting the said hollow space in communication with the outside, said core being also provided with conduits for sending elastomeric material to the semispherical bowls cavities.

The present invention will be better understood from the following detailed description referring (merely by way of non-limiting example) to the figures of the accompanying TABLES of drawing, in which.

Figure 2:
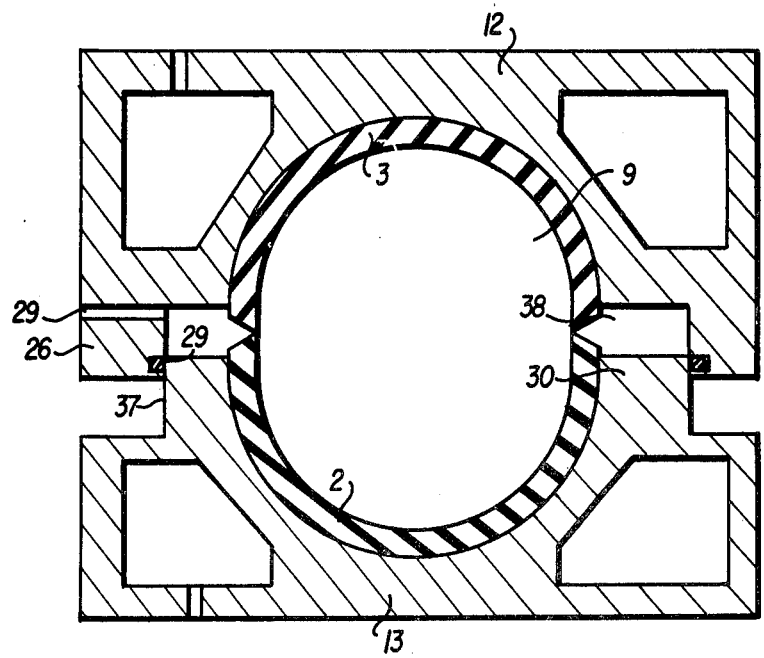
FIG. 2 shows a cross-sectional view of the device, according to our invention, during the formation of the closed hollow bodies.
Figure 3:
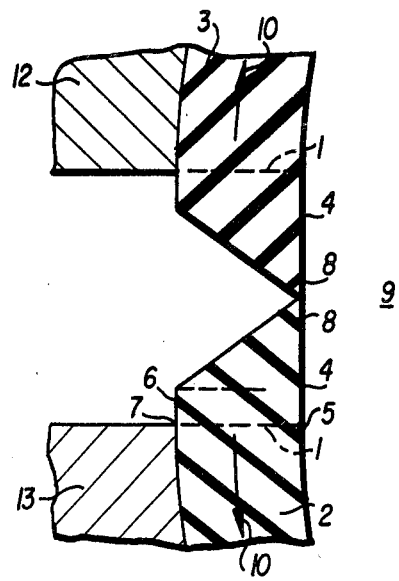

FIG. 3 gives a large-scale view of a detail of the device of FIG. 2.

Figure 4:
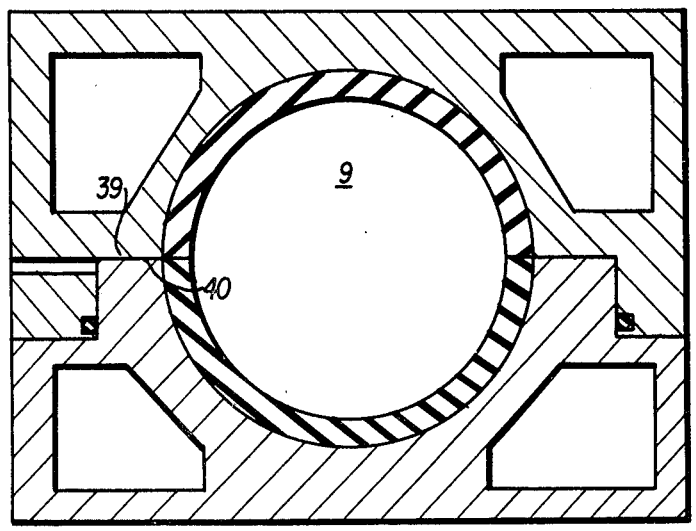

FIG. 4 shows a cross-section of the device, according to our invention, with an already formed closed hollow body.

In the more general form of its embodiment, the process, according to our invention, for manufacturing of a closed hollow body, and in particular for the formation of a closed hollow body in the form of a tennis ball, comprises the following phases:

to shape by extrusion, the complementary parts (in raw elastomeric material) of the closed hollow body itself—i.e. of a tennis ball, creating on the surrounding rim-edge of said complementary parts a tapered structural shape said structural shape having a point in correspondence of the border of the structural shape which is nearest the internal cavity of the tennis ball to join, end to end, the complementary parts in raw elastomeric material of the tennis balls, by exercising pressure between the structural shape that are present on the surrounding edges of the said complementary parts, in such a way that the said pressure in being exercised deforms first those parts of the structural shapes that are nearest to the closed cavity of the balls and then, gradually—as the structural shapes become deformed, exercising pressures also on the parts of the structural shapes comprised between their external borders and finally exercising the pressures also on those parts of the structural shapes that are outermost with respect to the cavity of the tennis ball to place under vacuum the external surface of the tennis ball is correspondence of the zone in which there takes place the joining of the complementary parts of the tennis ball—i.e. in the zone where a pressure is exercised between the structural shapes present on the surrounding edge of the said complementary parts. This phase is extremely important for the possibility of obtaining with the procedure a product that conforms perfectly; the motive for this shall be explained later on to cure in a per se known way, the raw elastomeric material forming the tennis ball.

In a particular form of embodiment of the process as set forth in the present invention, the complementary parts in raw elastomeric material that are formed for extruding the tennis balls, have the form of semispherical bowl and these semispherical bowls present, on the boundary edge, a structural shape of a raw elastomeric material, having an equal thickness to that of the semispherical bowls. This structural shape in its perpendicular section at its greater lay out, has the form of a rectangular trapeze with its side perpendicular at the bases coinciding with the border of the semispherical bowls, and with the greater base disposed along the extension of the internal surface of the semispherical bowls, and with the minor base disposed along the extension of the external surface of the semispherical bowl.

The form of the section of the foreseen structural shapes in correspondence of the contour of the semispherical bowl, is shown in FIG. 3. In fact, as can be seen from FIG. 3 the structural shapes present side 1 perpendicular to the bases, having a width equal to the thickness of the semispherical bowls 2 and 3, a greater base 4 disposed according to the tangent in 5 at the internal surface of the semispherical bowl and a lesser base disposed according to the tangent in 7 at the external surface of the semispherical bowl.

The two semispherical bowls in raw elastomeric material are joined together by putting them together in correspondence with the structural shapes and precisely by putting points 8 of the structural shapes into contact, one with the other.

During this operation, the space 9—delimited by the cavities of the two semispherical bowls are put under pressure by means of a pressurized gas.

At this point, is initiated the application of a pressure between the structural shapes (in raw elastomeric material) that are present on the outline of the semispherical bowls.

The pressure, between the two structural shapes, exercises—firstly in correspondence of the points 8 and i.e. in correspondence of that part of the structural shape that is innermost with respect to the inside cavity of the tennis ball, and then—as points 8 begin to deform the pressure between the structural shapes are exercised on the surface comprised between the surfaces 6 and 8, and finally—with a further deformation of the structural shape, the pressure is exercised also on the edge of the structural shape that results as outermost with respect to the closed cavity of the tennis ball.

During the compression of the structural shapes present on the outline of the semispherical bowls there is had a flow of elastomeric material in the direction of arrow 10 of FIG. 3. As a result of this flow of elastomeric material the inner and outer surfaces of each semispherical bowls in raw elastomeric material, are maintained parallel to each other, giving place to a spherical body that is perfectly shaped—even in zone joining of the two semispherical bowls together.

For guaranteeing a correct flow of the elastomeric material for the structural shapes—in order not to alter the parallelism between the internal and external surfaces of each semispherical bowl, it is essential to have the phase of the process for effectuating a depressurization outside the hollow body in correspondence of the joining zone of the semispherical bowl in raw elastomeric material—after point 8 of the structural shapes are set in contact with each other.

The process according to the present invention becomes ended with the phase of curing the uncured elastomeric material forming the tennis balls by administering heat to the said uncured elastomeric material.

According to an alternative embodiment of the process according to the present invention and described above, during the phase of the compression of the structural shapes present on the outline of the semispherical bowls, the pressure exercised between the said structural shapes is maintained constant, in such a way as to interrupt—for an interval of time, the deformations of the structural shapes themselves, continuing during this time to exercise a depressurization on the outside of the hollow body and in correspondence of the zone where the semispherical bowls are in contact one with the other.

The entity of this 'waiting period' cannot be defined as an absolute; but it depends upon the type of elastomeric material used for forming the tennis balls and cannot be defined theoretically—i.e. it can only be deduced through experimental tests.

Once this "waiting period' is over, the pressure is increased once more, between the structural shapes—until their deformation is completed.

According to another alternative embodiment of the process of the present invention, it comprises the phase of forming the semispherical bowls in uncured elastomeric material a formation by extrusion, and the phase of degasifying the said uncured elastomeric material—by means of a vacuum extruder, before forming by extrusion the said semispherical bowls.

According to still a further embodiment of the process according to the present invention in said process lacks the phase of putting under pressure, the inside cavity delimited by the internal surfaces of the two semispherical bowls at the moment when they come into contact with each other in correspondence of the structural shape provided on their borders.

For carrying out the process of manufacturing hollow bodies—and in particular for tennis balls, a device is employed, which also forms the object of the present invention.

Figure 1:
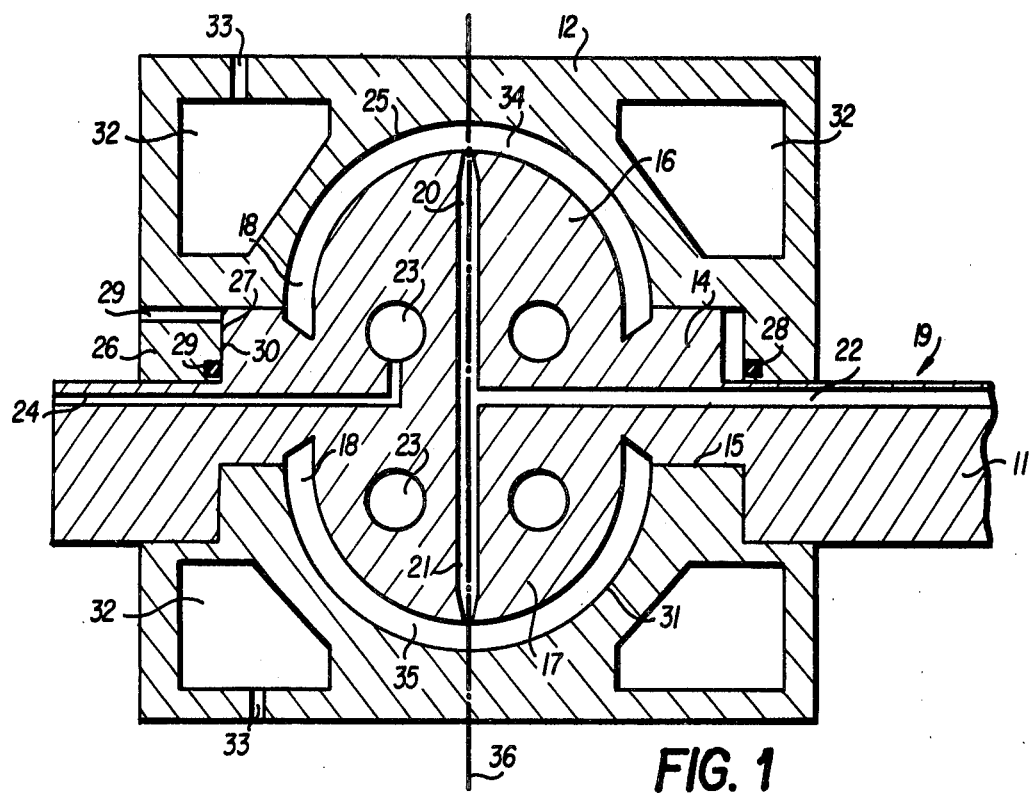
FIG. 1 shows a cross-sectional view of the device, according to our invention, for manufacturing parts necessary for forming closed hollow bodies.

A form of embodiment of this devices is represented in the FIGS. 1, 2 and 4.

As can be seen in FIG. 1, the device according to the present invention for manufacturing hollow bodies, comprises a core 11 and two covers 12 and 13 placed on opposite sides of the core.

The core 11 comprises a flat body presenting, on one of its faces, a discoidal relief 14, and on the other of its faces a cylindrical hollow 15, said relief 14 and said cylindrical hollow 15 beeing co-axial with each other.

In correspondence of the axis of the said relief 14 and said hollow 15, departs in cantilever fascion two semispherical projecting bodies 16 and 17 covered by a layer of material having a low friction coefficient, such as for example teflon, and along the outline of said semispherical bodies where they depart from the core 11 there is provided in the said core a circular groove 18 whose cross-section have the form of a rectangular trapeze—with the greater base placed on that side of the groove that has the lesser diameter; and with the side perpendicular to the bases of the trapeze form, constituting the groove opening.

Inside the core 11, there is present a T-shaped conduit 19, having branches 20 and 21 leading out in correspondence of the poles of the semispherical bodies and with the trunk 22, running through the core 11 so as to disemborge to the outside for beeing put in communication with an extruder of elastomeric material not shown in the figures and in particular with a vacuum extruder.

Into the core 11 in correspondence of the semispherical bodies, cavities 23 are provided and said cavities are in communication with the outside of the device through a conduit 24 for sending-into said cavities a cooling fluid.

As said previously, the device—according to the present invention, comprises two covers 12 and 13.

The cover 12 is a prismatic body provided on the side destined to come into contact with the core 11, with a semispherical cavity 25, having a radius equal to the radius of the outline of the annular groove 18 in correspondence of the minor base of the trapeze form of the said groove 18. Still on the side destined to come into contact with the core 11, the cover 12 bears an annular relief 26 protruding in cantilever fashion which foreseen into its face 27 a groove 28 housing a gasket 29; still in the annular relief 26, there is present a through conduit 29 made in correspondence of the part of the annular relief with which it departs in cantilever fashion from the cover 12.

The other cover 13 is also a prismatic body that presents, on it side destined to come into contact with the core 11, a cylindrical relief 30 having a dimension such as to be received inside the cylindrical hollow 15.

Moreover the external diametral diameters of the cylindrical relief 30 of the cover 13 and the diametral dimensions of the annular relief 26 of the cover 12 in correspondence of the face 27 of the latter, are substantially equal one with the other, in such a way as to allow to sealingly insert the said cylindrical relief 30 into the space defined internally by the annular relief 26.

In correspondence of the cylindrical relief 30 the cover 13 presents a semispherical cavity 31 having an equal radius as that of the annular groove 18 in correspondence of the minor base of the trapeze form of the section of groove 18.

Finally, inside the two covers 12 and 13, there are present cavities 32 that are in communication with the outside through canals 33, for sending into and extracting from said cavities fluids and in particular hot fluids—such as, for example, water vapour during the vulcanization of the uncured elastomeric material.

The function of the previously described device, is as follows.

Starting from the situation of the device as illustrated in FIG. 1—i.e. with the covers 12 and 13 in direct contact with the core 11, through an extruder—preferibly a vacuum extruder (not illustrated) is sent raw elastomeric material into the conduit 19.

The raw elastomeric material flows into conduit 19, circulates through conduits 20 and 21 and penetrates into the chambers 34 and 35 defined by the semispherical bodies 16 and 17 of the core 11 and the semispherical cavities of the covers 12 and 13 and the position where the raw elastomeric material loads out into said chambers 34 and 35 is in correspondence of the poles of said chambers 34 and 35.

The filling of the chambers 34 and 35 takes place through the advancing of the elastomeric material—according to circumferential fronts disposed as the parallels of the semispherical forms.

During this filling operation—of the chambers 34 and 35 with elastomeric material, cool fluid—such as water, is made circulate into the cavities 23; likewise into the cavities 32—is made to flow a cool fluid—such as oil. This is for preventing the elastomeric material—that fills the chambers 34 and 35—from vulcanizing.

With the filling of the chambers 34 and 35, with elastomeric material two bodies or semispherical bowls 2 and 3 are formed, each one having the form of a semispherical hollow body provided in correspondence of its delimiting borders of a rectangular trapeze-shaped profiles—as illustrated in FIG. 3 previously described with reference to the process according to the present invention.

Purely by way of non-limiting example, the elastomeric material—constituting the bodies or semispherical bowls 2 and 3, is an elastomeric compound having the following composition:

| natural rubber | 100 parts (per weight) |
| carbon black | 30 parts (per weight) |
| kaolin | 32 parts (per weight) |
| zinc oxide | 9 parts (per weight) |
| sulphur | 3.5 parts (per weight) |
| accelerators | 3 parts (per weight) | and this elastomeric compound presents a viscosity mooney comprised between 53 and 68 and has a shore hardness between 70 and 80.

Since the chambers 34 and 35 have been filled with elastomeric material—i.e. when the two bodies or semispherical bowls 2 and 3 have been formed the covers 12 and 13 are drawn away from the core 11 by moving them with device (not illustrated) and known per se through along the axis 36 of FIG. 1.

In this movement of drawing away the covers 12 and 13 from the core 11, the bodies or semispherical bowls 2 and 3 in raw elastomeric material remain adherent to the covers and move along with them when drawing away the core 11.

As the covers 12 and 13 have been drawn away from core 11, the core 11 is removed in such a way that the two said covers directly face each other.

At this point—still by means of the same device (not illustrated) and known per se by which the covers 12 and 13 were drawn away a reciprocal re-approaching of the said covers is caused.

With this re-approaching between the covers the annular relief 26 of cover 12 is placed in contact through its face 27 with the external surface 37 of the cylindrical relief 30, in such a way as to interpose the gasket 29 between the surfaces 27 and 37, so guaranteeing that the space 38 and the cavity 9 between the two bodies or semispherical bowls 2 and 3 are sealingly tight with respect to the outside of the device.

At this point, before the points 8 of the structural shapes (provided on the outline of the bodies or semispherical bowls 2 and 3) come into contact with each other, a gas under pressure—for example azote, air or mixtures of gas under pressure—are introduced, through the conduit 29. into the space defined previously and the value of the pressures is the one foreseen for the inside of the once formed tennis balls.

The two covers 12 and 13 are drawn reciprocally into contact one with the other (as shown in FIG. 2) with the points 8 of the structural shapes provided on the outline of the bodies or semispherical bowls 2 and 3.

When the points 8 have begun to deform, the reciprocal advancing movement—between the two covers 12 and 13 is stopped and in the space 38 is esecuted a de-pressurization by putting the conduit 29 into communication with means—(not represented) for this operation—such as, for example in communication with the outside of the device, or with a depressurizing or vacuum pump.

The duration of the interruption of the advancing movement between the two covers is comprised between 10 and 60 seconds—and by preference 30 seconds in the case of using the compound of elastomeric material—as previously indicated for the formation of the tennis balls.

When in the space 38, the depressurization has been executed, the reciprocal movement restarts between the covers 12 and 13—always maintaining the said space 38 in communication with the means (not shown) which bring about the depressurization.

From the time that the points 8 of the structural shapes foreseen on the outline of the bodies or semispherical bowls 2 and 3 have come into direct contact one with the other, there gegins the deformation of the said structural shapes that first and foremost take place along that part of the structural shape that is the innermost with respect the internal cavity of the hollow body and after take place the deformation of the structural shape between their borders and finally that part of the profiles which is the outermost with respect to the cavity of the hollow body.

At the termination of the approaching of the two covers—i.e. when the surfaces 39 and 40 of said covers have come into contact with each other, the two structural shapes have been completely annulled and the elastomeric material from which they were formed is flowed back into the internal and external surface defining the two bodies or semispherical bowls 2 and 3, maintaining these surfaces still parallel to one another.

The situation at this point is as illustrated in FIG. 4. The vulcanization of the elastomeric material of the tennis balls now begins, and to this purpose, within the cavities 32, are sent—by means of the conduits 33, a heating fluid—such as, for example saturated steam. At the end of the vulcanization, the two covers are drawn apart and the tennis ball or hollow body can be removed from the mould.

According to an alternative embodiment, before drawing apart the two covers, the hot fluid is extracted from the cavity 32 through the conduits 33, and in place of it, through the conduits 33 inside the cavity 32 is sent or made to circulate a cooling fluid—for cooling the vulcanized elastomeric material of the hollow bodies or tennis ball.

With the process and the device for manufacturing the hollow bodies—as set forth in this invention it is possible to obtain tennis balls having an extremely uniform "rebound" capacity, and to reduce to practically zero the quantity of waste output.

One explanation as to how the above indicated results are achieved could be as follows and is due to the presence of the particular type of structural shapes present on the outline of the semispherical bowls and above all, and is due to the de-pressurization effectuated outside the tennis ball while the structural shapes are being deformed under the action of the pressure exercised between them.

The particular form, of the structural shapes present on the outline of the semispherical bowls 2 and 3, in such that when the structural shapes comes into contact in correspondence of the points 8, give rise to stresses, on the contacting surfaces—between bodies or semispherical bowls 2 and 3 and the covers 12 and 13, so as to create a bending moment which acts in the direction for maintaining the said bodies or semispherical bowls 2 and 3 in contact with the covers 12 and 13.

The bending moment, which arises in the above said manner, thrusts the elastomeric material essentially against the semispherical surfaces of the covers 12 and 13.

However, during the deformation of the structural shapes present on the outline of the bodies or semispherical bowls 2 and 3—and precisely at the beginning of the said deformation (i.e. when only the points 8 are deformed) there is also had a movement of material towards the inside of the hollow body in formation. With the depressurizing operation, and precisely during the time in which the stop of the advancing movement of the two covers 12 and 13 happens there takes place a return flux of the elastomeric material moved towards the inside of the hollow body towards the outside.

In this way all the elastomeric material—constituting the structural shape present on the outline of the bodies or semispherical bowls, flows into the semispherical bowls themselves—with maintaining in any point parallel between each other the surfaces delimiting said semispherical bowls.

Moreover, the action of the depressurization consents for preventing the formation of gas bubbles in the joining zones of the two semispherical bowls.

Although certain particular forms of embodiments of the invention have been illustrated and described—it is to be understood that the invention includes in its ambit all other alternative embodiments available to a technician of the field.

What is claimed is:

1. In a device for manufacturing hollow bodies, a mold for molding the complementary halves of the hollow body, comprising:
    two covers having faces disposed face to face with each other, each cover having a cavity shaped as one-half of the exterior surface of the hollow body to be produced, said cavities being opened on the faces of the covers and communicating with each other when the mold is closed;
    an annular cylindrical relief and an annular cylindrical depression provided one on the face of one cover and the other on the face of the other cover where the covers contact as the mold is closed, said relief and said depression cooperating after they contact to produce an annular chamber aligned with the area where the halves of the hollow body to be produced are joined, the volume of said annular chamber being reduced as the mold is closed;

sealing means on the innermost portion of said relief;

a duct in said relief, said duct having an inner opening in communication with said annular chamber and an outer opening in communication with a face of the cover having said relief; and depressurizing means connected to the outer opening of said duct, whereby a tight depressurized annular chamber, which is aligned with the area where the halves of the hollow body to be produced are joined, is formed.

2. The device of claim 1 wherein said covers are a pair of mold shells and said device has a core carried by an intermediate member disposed between said shells which combines therewith to form a mold for molding complementary substantially hemispherical elastomeric bodies adapted to have their edges bonded together to form a closed hollow substantially spherical article, each of said shells having a substantially hemispherical cavity, and said intermediate member having oppositely disposed projecting members corresponding in shape to said cavities and disposed in said hemispherical cavities to form a core member spaced inwardly from the cavity walls, the core member and the cavity walls thereby cooperating to provide a mold cavity for receiving elastomeric material, said intermediate member having grooves in its surfaces facing said shells, each groove combining with a said cavity for receiving elastomeric material to complete the said mold cavity, a tapered end wall in said intermediate member which terminates the mold cavity, whereby a molded elastomeric article shaped in the said mold cavity has oppositely tapered edges which form a V-shaped space therebetween when the edge of a molded article from one cavity in one shell is disposed end to end with a molded article from the other mold cavity.

3. The device of claim 2 comprising means for conveying heated fluid to heat the contents of the mold cavity.

4. The device of claim 1, wherein said covers are a pair of complementary mold shells enclosing complementary hemispherical cavities which in combination form a substantially spherical cavity, the shells being separable so as to allow the introduction of a core member between the hemispherical cavities of the shells, the core member having members substantially concentric with the hemispherical cavities of said shells and spaced inwardly therefrom with hemispherical spaces therebetween, said core extending outwardly between the shells, thereby separating the mold into two parts and dividing the hemispherical spaces into two hemispherical shaped spaces which are mirror images of each other, said core having means for heating the mold, said core having means for introducing into said hemispherical shaped spaces an elastomeric composition to be shaped into two complementary halves which can be joined together to form said hollow body, said hemispherical shaped spaces terminating in ends which slope in one direction inside to outside in one part of the core and in the opposite direction in the second part of the core whereby the resulting molded elastomeric hemispherical shaped bodies when assembled edge to edge form a notch which is widest at the external surface of the article and thinnest at the internal surface.

5. The device of claim 1, wherein said covers are a pair of mold shells each having a substantially hemispherically shaped surface disposed with the said hemispherically shaped surface of one mold shell facing the corresponding surface of the other mold shell;

said device further including a mold core member mounted for movement into and out of a position between the hemispherically shaped surfaces of said mold shells, said core member having an annular ring disposed between and separating the mold shells and comprising substantially hemispherically shaped bodies integral with opposite sides of said ring, said bodies having surfaces substantially concentric with said hemispherically shaped surfaces of the mold shell and spaced radially inwardly therefrom, the mold shells and the core member thereby cooperating to form two separate hemispherically shaped cavities for molding elastomer to form complementary article halves of a hollow substantially spherically shaped article, said ring further comprising a conduit adapted to be connected externally of the ring to a source of elastomer and extending into each of said hemispherically shaped cavities for flow of elastomer into the hemispherically shaped cavities, an annular groove in said ring and associated with each of said hemispherically shaped cavities to form an annular closed end for said cavities, said groove having a wall substantially coincident with the said hemispherical surface of each mold shell and an opposite wall coincident with said hemispherical surfaces of said annular ring and a bottom wall disposed across the groove at an angle whereby the resulting substantially hemispherically shaped hollow bodies have annular edges around the open ends thereof which when assembled to form a substantially spherical article combine to form an outwardly open notch with their innermost edges contacting each other first as the said open ends are pressed together.

6. The mold of claim 5 wherein each mold shell comprises means for circulating a fluid therethrough to heat elastomer in said hemispherically shaped cavities.

7. The mold of claim 5 wherein said mold core member comprises means for conducting a cooling fluid into said mold core member to cool elastomer in said hemispherically shaped cavities.

8. The mold of claim 5 wherein said annular ring has an annular upstanding peripheral flange on one surface thereof and an annular groove around the peripheral edge of its opposite surface, and one of the mold shells has a groove in which said annular flange of the ring is disposed and the other mold shell has an annular integral flange disposed in said groove around the peripheral edge of the ring, and means for sealing the interfaces between the mating flanges and grooves of the ring and mold shells.

* * * * *